United States Patent
Ishizaki (10) Patent No.: US 9,824,419 B2
(45) Date of Patent: Nov. 21, 2017

(54) AUTOMATICALLY ENABLING A READ-ONLY CACHE IN A LANGUAGE IN WHICH TWO ARRAYS IN TWO DIFFERENT VARIABLES MAY ALIAS EACH OTHER

(71) Applicant: INTERNATIONAL BUSINESS MACHINES CORPORATION, Armonk, NY (US)

(72) Inventor: Kazuaki Ishizaki, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 52 days.

(21) Appl. No.: 14/946,902

(22) Filed: Nov. 20, 2015

(65) Prior Publication Data
US 2017/0148132 A1    May 25, 2017

(51) Int. Cl.
*G06F 12/00* (2006.01)
*G06T 1/60* (2006.01)
*G06F 12/0875* (2016.01)

(52) U.S. Cl.
CPC ............ *G06T 1/60* (2013.01); *G06F 12/0875* (2013.01); *G06F 2212/452* (2013.01); *G06F 2212/455* (2013.01)

(58) Field of Classification Search
CPC .............................. G06F 12/00; G06F 12/0888
See application file for complete search history.

(56) References Cited

U.S. PATENT DOCUMENTS

| | | | |
|---|---|---|---|
| 6,243,864 B1 * | 6/2001 | Odani ................ | G06F 8/434 717/154 |
| 6,640,293 B1 * | 10/2003 | Paredes ............... | G06F 11/0751 711/200 |
| 7,434,031 B1 * | 10/2008 | Spracklen ............ | G06F 9/3826 712/217 |

(Continued)

FOREIGN PATENT DOCUMENTS

CN          102541761          10/2014

OTHER PUBLICATIONS

Appleyard, "CUDA Pro Tip: Optimize for Pointer Aliasing", 2014, https://devblogs.nvidia.com/parallelforall/cuda-pro-tip-optimize-pointer-aliasing/, pp. 1-6.*

(Continued)

*Primary Examiner* — Barry Drennan
*Assistant Examiner* — Phong Nguyen
(74) *Attorney, Agent, or Firm* — Tutunjian & Bitetto, P.C.; Vazken Alexanian (57) ABSTRACT

A method and system are provided for executing, by a processor including a read-only cache, a program having a plurality of variables including a first variable and a second variable. Each variable is for executing a respective read operation or a respective write operation for an object. The method includes providing a first code that uses the read-only cache and a second code that does not use the read-only cache. The method further includes determining, by the processor, whether a first object designated by the first variable is aliased or not aliased with a second object (Continued)

designated by the second variable. The method also includes executing, by the processor, the first code when the first object is not aliased with the second object, and the second code when the first object is aliased with the second object.

17 Claims, 4 Drawing Sheets

(56) References Cited

U.S. PATENT DOCUMENTS

| | | | | |
|---|---|---|---|---|
| 2007/0261042 | A1* | 11/2007 | Chen | G06F 8/4442 717/148 |
| 2009/0248985 | A1* | 10/2009 | Ayguade | G06F 8/4442 711/125 |
| 2012/0102468 | A1* | 4/2012 | Lefurgy | G06F 11/3636 717/128 |
| 2013/0019232 | A1* | 1/2013 | Cui | G06F 8/443 717/151 |
| 2013/0198475 | A1* | 8/2013 | Serlet | G06F 12/0269 711/164 |
| 2015/0058567 | A1 | 2/2015 | Hechtman et al. | |
| 2015/0149745 | A1* | 5/2015 | Eble | G06F 9/526 712/216 |
| 2015/0286472 | A1* | 10/2015 | Lim | G06F 8/443 717/151 |

OTHER PUBLICATIONS

Ishizaki et al., "Compiling and Optimizing Java 8 Programs for GPU Execution", 2015, International Conference on Parallel Architecture and Compilation, pp. 419-431.*

Jablin et al., "Automatic CPU-GPU Communication Management and Optimization", 2011, Proceedings of the 32nd ACM SIGPLAN Conference on Programming Language Design and Implementation, pp. 142-151.*

* cited by examiner

AUTOMATICALLY ENABLING A READ-ONLY CACHE IN A LANGUAGE IN WHICH TWO ARRAYS IN TWO DIFFERENT VARIABLES MAY ALIAS EACH OTHER

BACKGROUND

Technical Field

The present invention relates generally to information processing and, in particular, to automatically enabling a read-only cache in a language in which two arrays in two different variables may alias each other.

Description of the Related Art

There are languages in which two arrays in two different variables may alias each other such as C and Java. For example, in a sample program, a[ ] and b[ ] may point to the same array.

In computer programming, and as used herein, aliasing refers to the situation where the same memory location can be accessed using different names. Such a situation can be quite problematic, particularly in the case of sequential writes. For example, if two writes are aliased and occur out of sequence, an incorrect program result will likely occur. The same is true for a write access and a read access. In contrast, if two reads are aliased and occur out of sequence, the program result will likely not be affected.

A general purpose graphics processing unit (GPGPU) by NVIDIA® provides a read-only cache, which can be accessed fast, on a chip. This read-only cache is not coherent with write actions to other memory system. Thus, the read-only cache must be used only for accesses to memory that must not be written by the same GPU code.

The CUDA language provided by NVIDIA® allows a programmer to enable a read-only cache by decorating pointer arguments using "const_restrict_", or using an intrinsic "_ldg( )" for each access. The Open Accelerators (OpenACC) programming standard does not allow a programmer to enable read-only cache explicitly.

TABLE 1 below shows a sample program written in Java.

TABLE 1

```
void test(int a[ ], int b[ ]) {
    IntStream.range(0, b.length).parallel( ).forEach(i -> {    a[i] = b[i] * 2;
       a[i] = b[i] * 3;
    });
}
```

In the sample program written in Java (or in an equivalent program in C with an OpenACC directive), a read-only cache is not automatically enabled. This program has lexical variables that points to arrays, and it has one or more lexical variables that do not perform write operations to arrays. If a compiler naively generate a code from a parallel stream to enable read-only cache for accesses regarding b[ ] in the sample program, the code will not work correctly when a[ ] and b[ ] point to the same array.

Thus, there is a need for automatically enabling a read-only cache in a computer programming language in which two arrays in two different variables can alias each other.

SUMMARY

According to an aspect of the present principles, a method is provided. The method is for executing, by a processor including a read-only cache, a program having a plurality of variables including a first variable and a second variable. Each of the plurality of variables is for executing at least one of a respective one of a plurality of read operations or a respective one of a plurality of write operations for an object. The method includes providing a first code that uses the read-only cache and a second code that does not use the read-only cache. The method further includes determining, by the processor, whether a first object designated by the first variable is aliased or not aliased with a second object designated by the second variable. The method also includes executing, by the processor, the first code when the first object is not aliased with the second object. The method additionally includes executing, by the processor, the second code when the first object is aliased with the second object.

According to another aspect of the present principles, a computer program product is provided. The computer program product is for controlling execution of a program by a processor including a read-only cache. The program has a plurality of variables including a first variable and a second variable. Each of the plurality of variables is for executing at least one of a respective one of a plurality of read operations or a respective one of a plurality of write operations for an object. The computer program product includes a non-transitory computer readable storage medium having program instructions embodied therewith. The program instructions are executable by a computer to cause the computer to perform a method. The method includes providing a first code that uses the read-only cache and a second code that does not use the read-only cache. The method further includes determining, by the processor, whether a first object designated by the first variable is aliased or not aliased with a second object designated by the second variable. The method also includes executing, by the processor, the first code when the first object is not aliased with the second object. The method additionally includes executing, by the processor, the second code when the first object is aliased with the second object.

According to yet another aspect of the present principles, a system is provided. The system is for executing a program having a plurality of variables including a first variable and a second variable. Each of the plurality of variables is for executing at least one of a respective one of a plurality of read operations or a respective one of a plurality of write operations for an object. The system includes a compiler for providing a first code that uses the read-only cache and a second code that does not use the read-only cache. The system further includes a processor, having a read-only cache, for determining whether a first object designated by the first variable is aliased or not aliased with a second object designated by the second variable, executing the first code when the first object is not aliased with the second object, and executing the second code when the first object is aliased with the second object.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to automatically enabling a read-only cache in a language in which two arrays in two different variables may alias each other.

In an embodiment, the present principles involve checking whether or not a condition exists for enabling a read-only cache at runtime. Code enabling a read-only cache is executed only when the condition exists.

Figure 1:
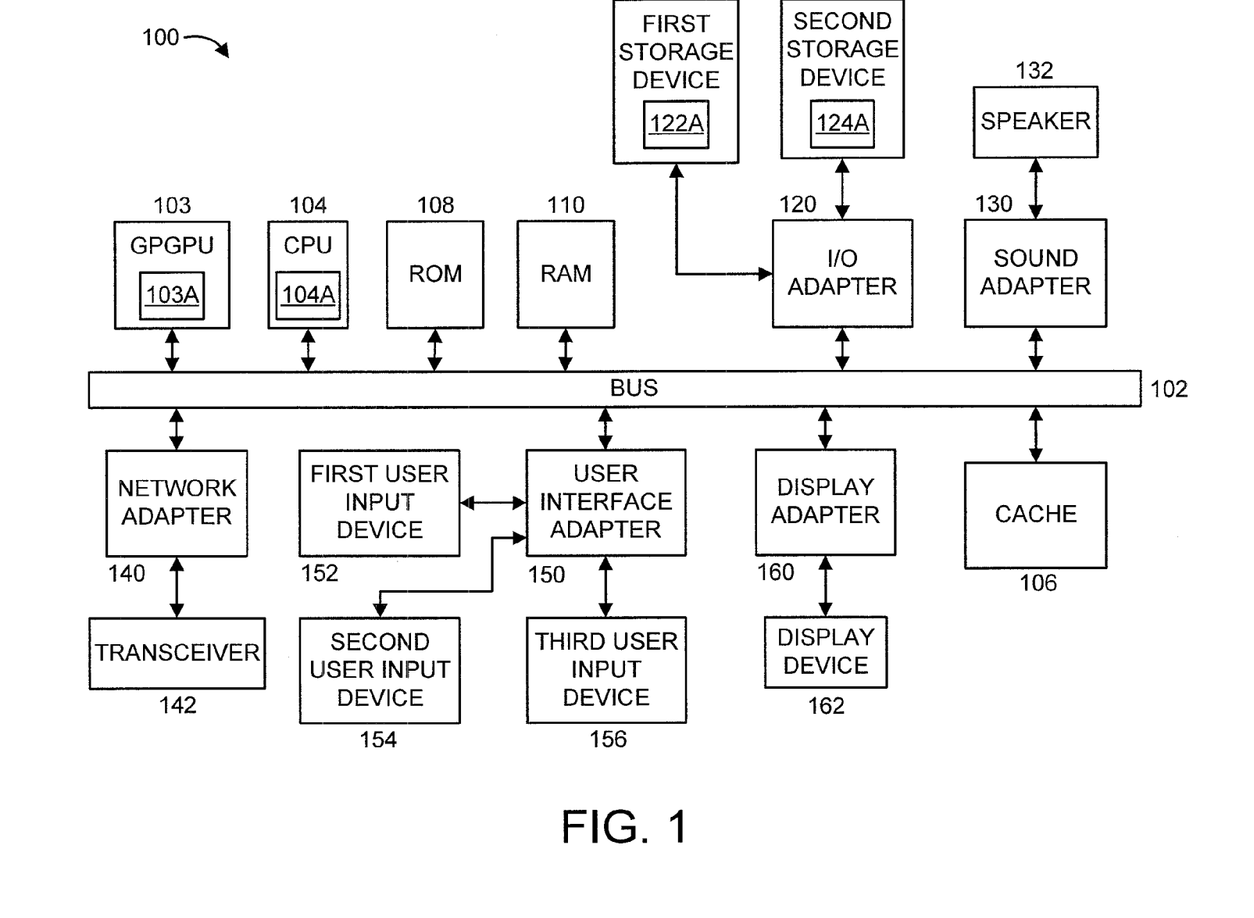
FIG. 1 shows an exemplary processing system 100 to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 104 and a GPGPU 103 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. While cache 106 is intended to represent an off-chip cache, CPU 104 can have one or more on-chip caches (e.g., L1, L2, etc., collectively denoted by the reference numeral 104A). In an embodiment, at least one cache from among the one or more caches 104A is a read-only cache. Moreover, GPGPU 103 includes at least one cache 103A. Cache 103 is a read-only cache. In the embodiment of FIG. 1, cache 103A is on-chip with respect to the GPGPU103. In other embodiments, cache 103A is used by GPGPU 103 but is off-chip with respect to GPGPU 103. The present principles can be applied to any of CPU 104 and read-only cache 104A and/or GPGPU 103 and read-only cache 103A.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices. Storage device 122 and/or storage device 124 can be implemented as a cache. Storage device 122 includes an operating system 122A. Storage device 124 includes one or more compilers, collectively denoted by the reference numeral 124A.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
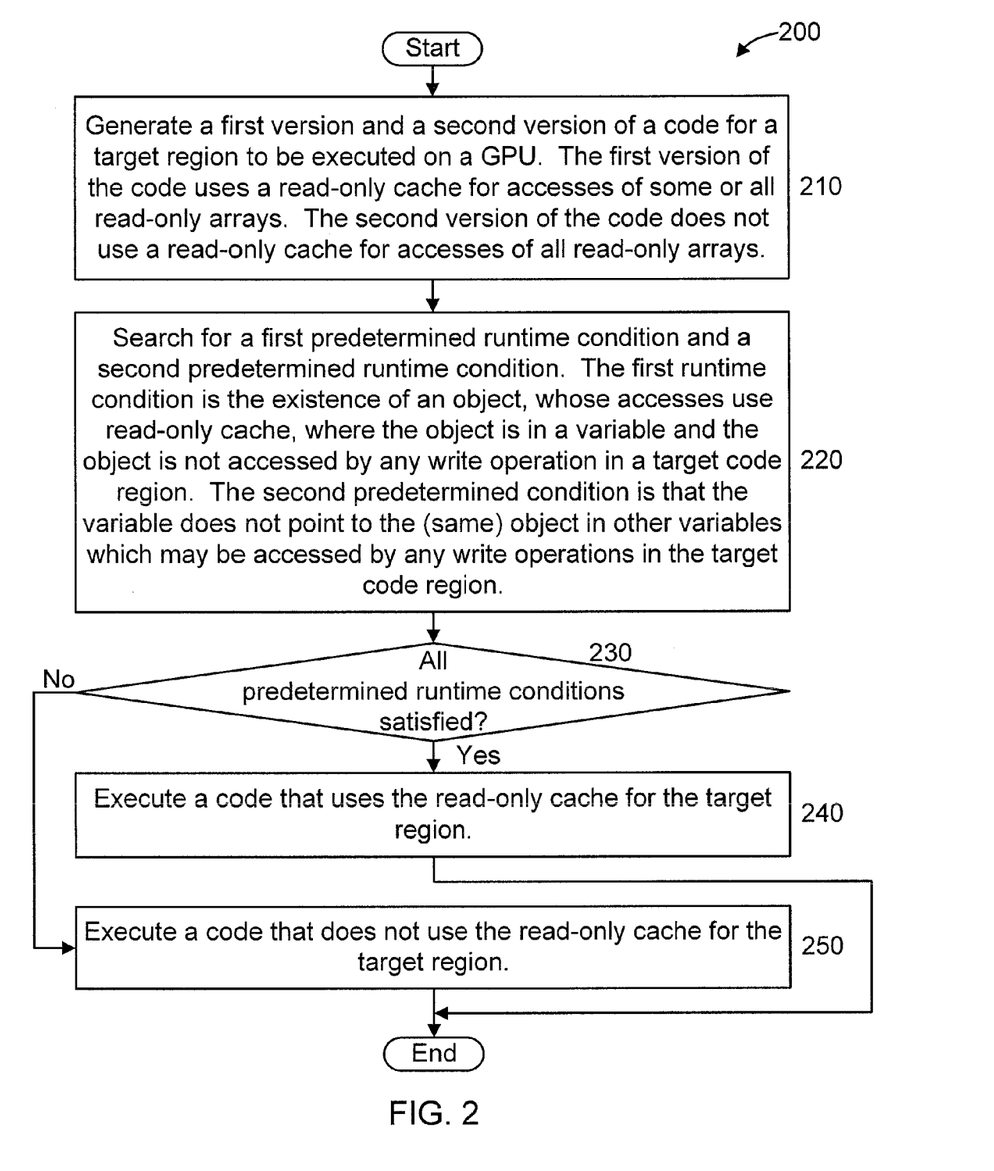
FIG. 2 shows an exemplary method 200 for enabling a read-only cache at runtime, in accordance with an embodiment of the present principles.
Figure 3:
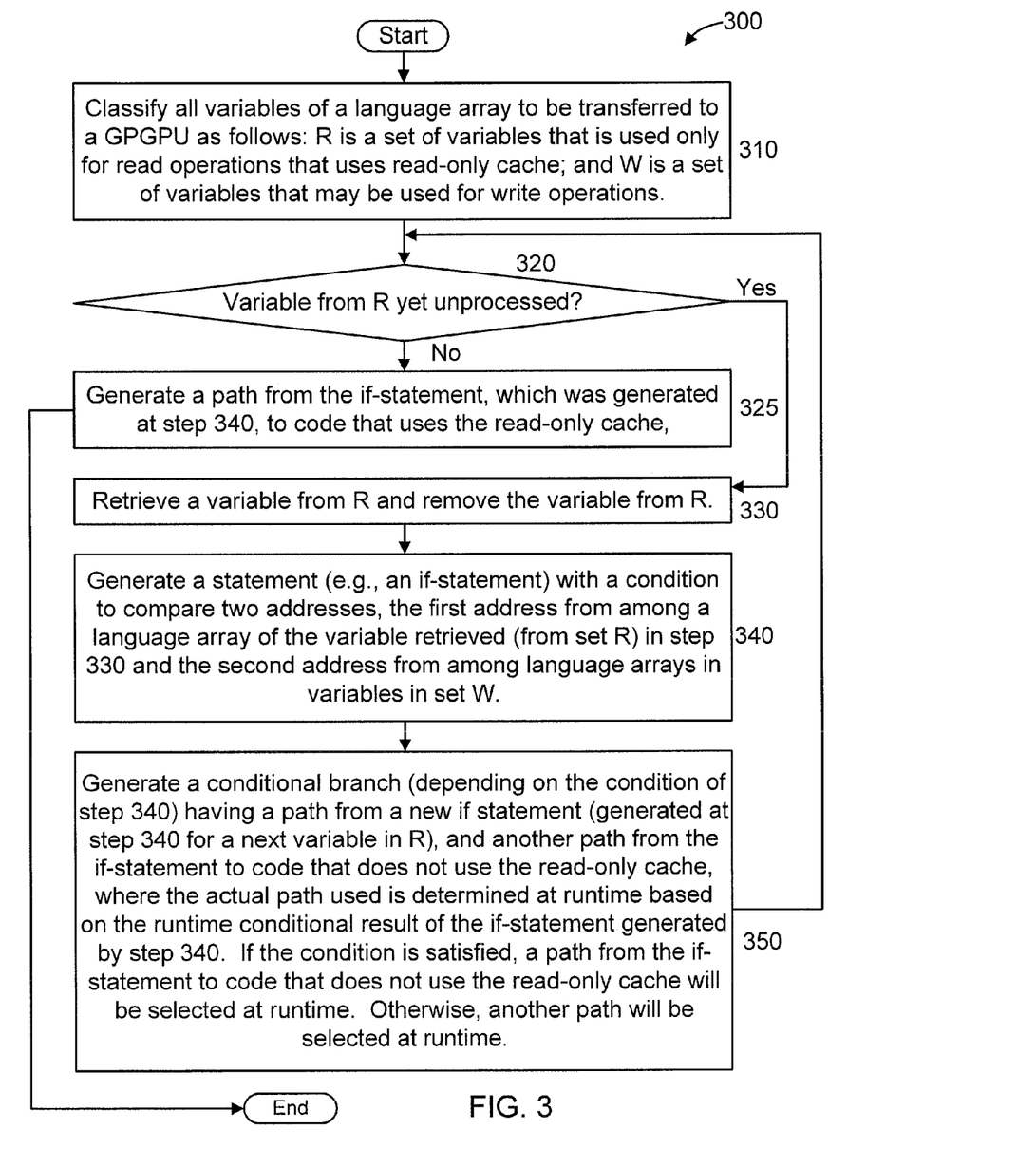
FIG. 3 shows an exemplary method 300 for generating check code by a compiler, in accordance with an embodiment of the present principles.
Figure 4:
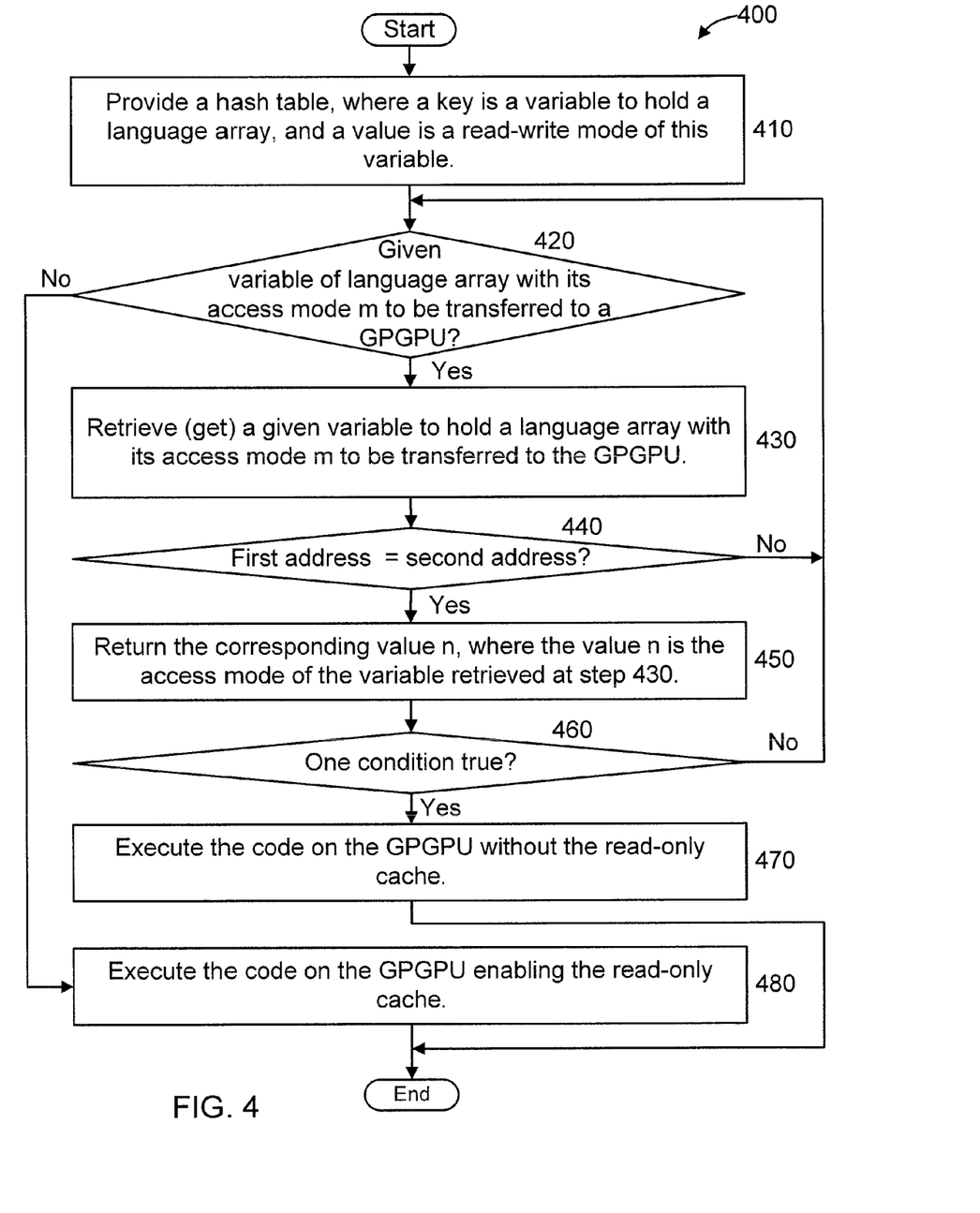
FIG. 4 shows an exemplary method 400 for checking a condition at runtime without generating check code, in accordance with an embodiment of the present principles.

It is to be appreciated that processing system 100 may perform at least part of the methods described herein including, for example, at least part of method 200 of FIG. 2 and/or at least part of method 300 of FIG. 3 and/or at least part of method 400 of FIG. 4.

Three exemplary methods 200, 300, and 400 will now be described with respect to FIGS. 2, 3, and 4. Method 200 provides a general overview of the present principles, while methods 300 and 400 provides two exemplary ways of implementing the present principles. Of course, given the teachings of the present principles provided herein, variations of these methods can be readily implemented while maintaining the spirit of the present principles.

FIG. 2 shows an exemplary method 200 for enabling a read-only cache at runtime, in accordance with an embodiment of the present principles. The read-only cache is enabled in a language in which two arrays in two different variables can alias each other.

At step 210, generate a first version and a second version of a code for a target region to be executed on a GPU. The first version of the code uses a read-only cache for accesses of some or all read-only arrays. The second version of the code does not use a read-only cache for accesses of all read-only arrays.

At step 220, search for a first predetermined runtime condition and a second predetermined runtime condition. The first runtime condition is the existence of an object, whose accesses use read-only cache, where the object is in a variable and the object is not accessed by any write operation in a target code region. The second predetermined condition is that the variable does not point to the (same) object in other variables which may be accessed by any write operations in the target code region.

At step 230, determine whether or not all of the predetermined runtime conditions have been satisfied. If so, then the method proceeds to step 240. Otherwise, the method proceeds to step 250.

At step 240, execute a code that uses the read-only cache for the target region.

At step 250, execute a code that does not use the read-only cache for the target region.

FIG. 3 shows an exemplary method 300 for generating check code by a compiler, in accordance with an embodiment of the present principles. The check code is used for enabling a read-only cache at runtime. The read-only cache is enabled in a language in which two arrays in two different variables can alias each other.

At step 310, classify all variables of a language array (that is, an array in a particular computer programming language) to be transferred to a GPGPU as follows: R is a set of variables that is used only for read operations that uses read-only cache; and W is a set of variables that may be used for write operations.

At step 320, determine if there is a variable from R yet unprocessed by method 300. If so, then the method proceeds to step 330. Otherwise, the method proceeds to step 325.

At step 325, generate a path from the if-statement, which was generated at step 340, to code that uses the read-only cache, and the method is terminated.

At step 330, retrieve (get) a variable from R and remove the variable from R.

At step 340, generate a statement (e.g., an if-statement) with a condition to compare two addresses, the first address from among a language array of the variable retrieved (from set R) in step 330 and the second address from among language arrays in variables in set W. The condition is true if these two addresses are the same. The condition is later evaluated at runtime.

At step 350, generate a conditional branch (depending on the condition of step 340) having a path from a new if statement (generated at step 340 for a next variable in R), and another path from the if-statement to code that does not use the read-only cache, where the actual path used is determined at runtime based on the runtime conditional result of the if-statement generated by step 340. If the condition is satisfied, a path from the if-statement to code that does not use the read-only cache will be selected at runtime. Otherwise, another path will be selected at runtime.

The following example in provided with respect to method 300.

Let us think about the case of two variables a and b in R and w in W.

First, step 330 takes a, and steps 340 and 350 generate the following if-statement:

```
"if (a == w) {
    go to code that does not use the read-only cache
} else {
    ...
}"
```

Then, step 330 takes b, and steps 340 and 350 generate the following code:

```
"if (a == w) {
    go to code that does not use the read-only cache
} else {
    if (b == w) {
        go to code that does not use the read-only cache
    } else {
        ...
    }
}"
```

At the end of step 350, we are missing code for " . . . ". Then, go to step 320. Since there is no more variables in R, step 325 generates the following code: "go to code that uses the read-only cache" at " . . . ". This is a reason that step 325 generates a path.

Referring back to the source program of TABLE 1, the following pseudocode shown in TABLE 2 is generated based on the principles of method 300.

TABLE 2

```
// code for CPU
void test(int a[ ], int b[ ]) {
    // allocate device buffer d_a for A and transfer data to device buffer
    // allocate device buffer d_b for B and transfer data to device buffer
    ...
    if (*a != *b)
        testGPUwROC<<<...>>>(d_A, d_B); // GPU code enabling
        read-only cache
    else
        testGPU<<<...>>>(d_A, d_B); // GPU code without read-only cache
    ...
}
```

FIG. 4 shows an exemplary method 400 for checking a condition at runtime without generating check code, in accordance with an embodiment of the present principles.

At step 410, provide a hash table, where a key is a variable to hold a language array, and a value is a read-write mode of this variable.

At step 420, determine if there is a given variable of a language array with its access mode m (READ, WRITE, READWRITE (that is, both a read and a write), or NONE) to be transferred to a GPGPU. If so, then the method proceeds to step 430. Otherwise, the method proceeds to step 480.

At step 430, retrieve (get) a given variable to hold a language array with its access mode m (READ, WRITE, READWRITE, or NONE) to be transferred to the GPGPU.

At step 440, check, using the hash table, whether a first address and a second address are the same (i.e., first address=second address). The first address is for a language array in a variable stored in the hash table. The second address is for the given variable (retrieved at step 430). If so, then the method proceeds to step 450. Otherwise, the method returns to step 420.

At step 450, return the corresponding value n, where the value n is the access mode (READ, WRITE, READWRITE, or NONE) of the variable retrieved at step 430.

At step 460, determine whether or not one of the following predetermined conditions from a set (of two, in this case) of predetermined conditions (using the value n returns at step 450):
1. (m is READ and m is accessed through read-only cache) and (n is WRITE or n is READWRITE); and
2. (n is READ and n is accessed through read-only cache) and (m is WRITE or m is READWRITE).

If so, then the method proceeds to step 470. Otherwise, the method returns to step 420.

At step 470, execute the code on the GPGPU without the read-only cache.

At step 480, execute the code on the GPGPU enabling the read-only cache.

Referring back to the source program of TABLE 1, the following pseudocode shown in TABLE 3 is generated based on the principles of method 400.

TABLE 3

```
// code for CPU
void test(int a[ ], int b[ ], int len) {
    bool noROC = false;
    initGPU(C); // allocate hashtable in C->h
    noROC |= copyToGPU(C, a, &d_A,
        a.length*4, W);
    noROC |= copyToGPU(C, b, &d_B,
        b.length*4, R);
    if (!noROC)
        testGPUwROC<<<...>>>(d_A, d_B);
```

TABLE 3-continued

```
       else
           testGPU<<<...>>>(d_A, d_B);
       copyFromGPU(C, b, d_b, b.length*4);
       copyFromGPU(C, a, d_a, a.length*4);
       termGPU(C); // free hashtable in C->h
   }
```

Further referring back to the source program of TABLE 1, the following runtime code shown in TABLE 4 is generated based on the principles of method 400.

TABLE 4

```
   bool copyToGPU(C, int *a, int **d, int len, int m) {
       int n = C->h->get(a); // n is NONE/R/W/RW
       if (n == NONE) {
           cudaMalloc(d, len);
           cudaMemcpy(*d, a, len, Host2Device);
           C->h->put(a, m);
       }
       return
           (((m == R) && ((n == W) || (n == RW))) ||
           ((n == R) && ((m == W) || (m == RW))));
   }
   void copyFromGPU(C, int *a, int *d,int len) {
       cudaMemcpy(a, d, len, Device2Host);
       cudaFree(d);
       C->h->remove(a);
   }
```

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for executing, by a processor including a read-only cache, a program having a plurality of variables including a first variable and a second variable, each of the plurality of variables for executing at least one of a respective one of a plurality of read operations or a respective one of a plurality of write operations for an object, the method comprising:
provicing a first code that uses the read-only cache and a second code that does not use the read-only cache;
determining, by the processor, whether a first object designated by the first variable is aliased or not aliased with a second object designated by the second variable;
executing, by the processor, the first code when the first object is not aliased with the second object; and
executing, by the processor, the second code when the first object is aliased with the second object,
wherein said determining step comprises generating check code for determining whether the first object is aliased or not aliased with the second object, and
wherein said generating step comprises:
generating code for determining, as a first condition, that the first object in the first variable has accesses that use only the read-only cache and that the first object in the first variable is not accessed by any of the plurality of write operations in a target code region; and
generating code for determining, as a second condition, that the first variable does not point to the first object in other ones of the plurality of variables that are accessible by any of the plurality of write operations in the target code region.

2. The method of claim 1, wherein said determining step comprises determining whether the first object, which executes a given one of the plurality of read operations but does not execute any of the plurality of write operations, is the same as or different from the second object which executes a given one of the plurality of write operations.

3. The method of claim 1, further comprising classifying each of the plurality of variables into a corresponding one of a first and a second set, the first set including variables used only for the read, the second set including variables used only for the write.

4. The method of claim 3, further comprising generating check code for determining whether the first object is aliased with the second object, the check code referencing the first set and the second set.

5. The method of claim 1, wherein the second code is executed when at least one of the first condition and the second condition is true.

6. The method of claim 1, wherein the processor is a graphics processing unit.

7. The method of claim 1, wherein said determining step determines whether the first object designated by the first variable is aliased or not aliased with the second object designated by the second variable based on access modes used by the first variable and the second variable.

8. The method of claim 7, wherein the access mode of at least one of the first variable and the second variable is used as a respective value in a hash table whose keys comprise at least one of the first variable and the second variable.

9. A computer program product for controlling execution of a program by a processor including a read-only cache, the program having a plurality of variables including a first variable and a second variable, each of the plurality of variables for executing at least one of a respective one of a plurality of read operations or a respective one of a plurality of write operations for an object, the computer program product comprising a non-transitory computer readable storage medium having program instructions embodied therewith, the program instructions executable by a computer to cause the computer to perform a method comprising:

providing a first code that uses the read-only cache and a second code that does not use the read-only cache;

determining, by the processor, whether a first object designated by the first variable is aliased or not aliased with a second object designated by the second variable;

executing, by the processor, the first code when the first object is not aliased with the second object; and executing, by the processor, the second code when the first object is aliased with the second object, wherein said determining step comprises generating check code for determining whether the first object is aliased or not aliased with the second object, and wherein said generating step comprises:

generating code for determining, as a first condition, that the first object in the first variable has accesses that use only the read-only cache and that the first object in the first variable is not accessed by any of the plurality of write operations in a target code region; and generating code for determining, as a second condition, that the first variable does not point to the first object in other ones of the plurality of variables that are accessible by any of the plurality of write operations in the target code region.

10. The computer program product of claim 9, wherein said determining step comprises determining whether the first object, which executes a given one of the plurality of read operations but does not execute any of the plurality of write operations, is the same as or different from the second object which executes a given one of the plurality of write operations.

11. The computer program product of claim 9, wherein said determining step comprises generating check code for determining whether the first object is aliased or not aliased with the second object.

12. The computer program product of claim 11, wherein said generating step comprises:

generating code for determining, as a first condition, that the first object in the first variable has accesses that use only the read-only cache and that the first object in the first variable is not accessed by any of the plurality of write operations in a target code region; and generating code for determining, as a second condition, that the first variable does not point to the first object in other ones of the plurality of variables that are accessible by any of the plurality of write operations in the target code region.

13. The computer program product of claim 9, wherein said determining step determines whether the first object designated by the first variable is aliased or not aliased with the second object designated by the second variable based on access modes used by the first variable and the second variable.

14. The computer program product of claim 13, wherein the access mode of at least one of the first variable and the second variable is used as a respective value in a hash table whose keys comprise at least one of the first variable and the second variable.

15. A system for executing a program having a plurality of variables including a first variable and a second variable, each of the plurality of variables for executing at least one of a respective one of a plurality of read operations or a respective one of a plurality of write operations for an object, the system comprising:

a storage device having a compiler for providing a first code that uses a read-only cache and a second code that does not use the read-only cache; and a processor, having a read-only cache, for determining whether a first object designated by the first variable is aliased or not aliased with a second object designated by the second variable, executing the first code when the first object is not aliased with the second object, and executing the second code when the first object is aliased with the second object, wherein the first variable has an access mode m, the second variable has an access mode n, and said determining step is performed using a first condition and a second condition, the first condition being that (the access mode m is a read operation that is accessed through the read-only cache) and (the access mode n is a write operation or a readwrite operation), and the second condition being that (the access mode n is the read operation that is accessed through the read-only cache) and (the access mode m is the write operation or the readwrite operation).

16. The system of claim 15, wherein the first object designated by the first variable is determined to be aliased with the second object designated by the second variable when the first condition or the second condition is true.

17. The system of claim 15, wherein the processor provides a hash table for mapping keys to values, the keys including the first variable, and the values including the access mode of the first variable.

* * * * *